United States Patent [19]

Delorme

[11] 3,896,285

[45] July 22, 1975

[54] PROCESS AND DEVICE FOR WELDING OF MULTIWIRE CABLES

[75] Inventor: Raymond Louis Delorme, Bagnolet, France

[73] Assignee: Societe Honeywell Bull (Societe Anonyme), Paris, France

[22] Filed: May 16, 1973

[21] Appl. No.: 360,881

[52] U.S. Cl. ...................... 219/80; 219/85; 219/86; 219/87

[51] Int. Cl. ...................... B23k 11/00

[58] Field of Search .................... 219/78, 80, 85–87, 219/91; 228/4

[56] References Cited

UNITED STATES PATENTS

| | | | |
|---|---|---|---|
| 3,155,809 | 11/1964 | Griswold | 219/86 |
| 3,342,972 | 9/1967 | Penberg | 219/86 X |
| 3,393,288 | 7/1968 | Barstow et al. | 219/91 X |
| 3,648,354 | 3/1972 | Mashino | 228/4 |

*Primary Examiner*—C. L. Albritton
*Attorney, Agent, or Firm*—Fred Jacob

[57] ABSTRACT

A process and device are provided for welding a flat multiwire cable onto a printed circuit, the wires of the cable being evenly spaced and the printed circuit comprising conductive strips of equal spacing. In accordance with the invention, the conductors are stripped close to their end, bent so that their lower portion is of the same length as the conductive strip and undergo a preliminary cut. The lower portion of the wire is there inserted onto the conductive strip and heated. The portion which is preliminary cut, is removed by plying.

8 Claims, 8 Drawing Figures

PROCESS AND DEVICE FOR WELDING OF MULTIWIRE CABLES

BACKGROUND OF THE INVENTION

The present invention is concerned with a process and device for weldings, intended especially, but not exclusively, for the welding of wires of multiwire cables, particularly of a flat cable onto what is called a printed circuit, onto which a certain number of conductive zones have been applied by photoengraving. A printed circuit of such a type may be used for connecting said cable with the contact ends of a connector, such as that described in French Pat. No. 1,541,094 of the Industrial Company Honeywell Bull. It is the purpose of these connectors to accomplish the connection of subassemblies distributed on printed circuit cards. Yet, the links between the subassemblies require ever more numerous channels, particularly for informative purposes, in view of the rising complexity of the circuits, with respect to the display of information in a parallel manner.

To avoid flutter between the different channels, it is, on the other hand, necessary to shield every one of them by interposing grounded wires between two "carrying" conductors.

The connection between different wires and conductive zones of the printed circuit mounted on the connector must exhibit good electric conductivity and an adequate mechanical resistance. In other words, the welding between the printed conductor and the wire will have to be performed over a maximum length. Also, the dimensions of the connectors have to be appropriate in relation to the microelectronic circuits. This means that a great number of conductors must be welded on a small area. This operation is now carried out by hand by means of an optical magnifying device. Yet this operation is lengthy and therefore costly, of uncertain reliability, and ill-suited for mass production. The present invention serves to automate the welding operations.

SUMMARY OF THE INVENTION

According to the present invention, the process of welding a flat multiwire cable, in which the insulated wires are evenly spaced in relation to each other in an insulating tubing, onto a printed circuit including conductive zones whose pitch is equal to that of the wires, is characterized in that;

the conductors are stripped near their ends over a portion of their length, the end being sleeved, the stripped portion is bent so as to form a U whose lower part is roughly of equal length to the length of the conductive zones whose one prong placed to the side of the connecting end has been previously cut, the lower portion of the U is brought into contact with the conductive zones which were previously coated with weld by a soldering process, and heated, and the preliminary cut portion is removed by bending.

It is also the objective of the present invention to provide a device for putting into effect the above-described operations which include bending tools, and a welding set.

BRIEF DESCRIPTION OF THE DRAWING

An understanding of the invention will be facilitated by the following description, with reference to the drawing wherein.

DESCRIPTION OF THE PREFERRED EMBODIMENT

Figure 1:
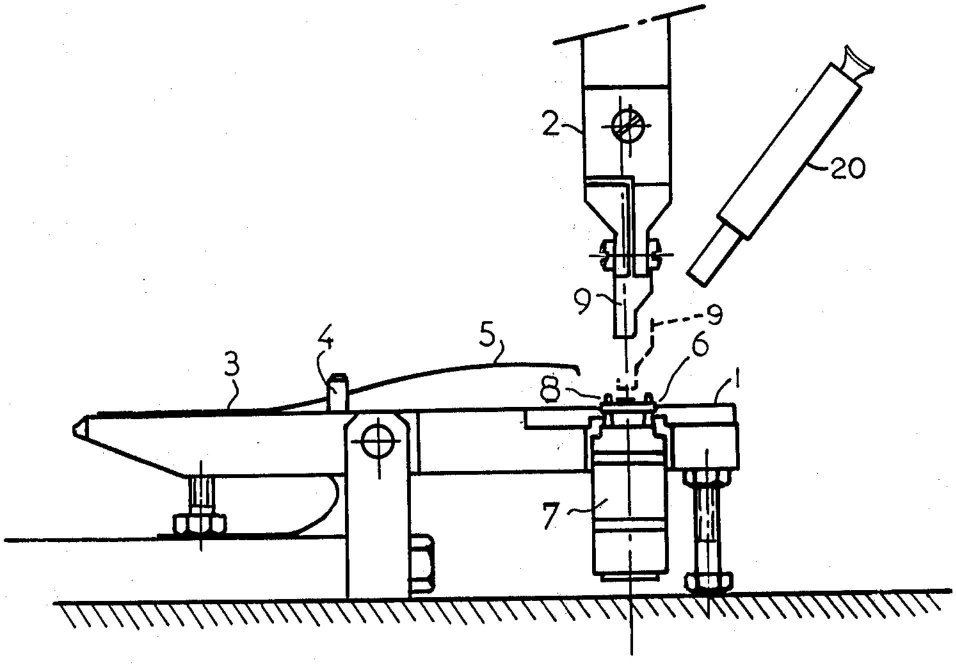
FIG. 1 is an elevational view of a pedestal and welding head according to the present invention.

In FIG. 1 there is illustrated a pedestal 1 and a head 2 of an electric welding machine of a known type. The pedestal 1 rests on the table of the welding machine and consists of a guide path 3 defined by two guide feet 4 to which a holding spring 5 is attached and whose function will be explained below. An opening 6 is provided in the pedestal 1 for inserting the connector 7 such that only the printed circuit of the connection 8 thereof appears above the pedestal and below the welding head 2. The welding head is equipped with a special peen 9 whose shape is shown in greater detail in FIGS. 7*a* and 7*b*. The pedestal 1 is positioned in such a way that the peen 9, in the low position, opposite to the slot 6, comes against the printed circuit of the connection 8. The peen 9, in the low position, exerts a pressure on the printed circuit.

Figure 2:
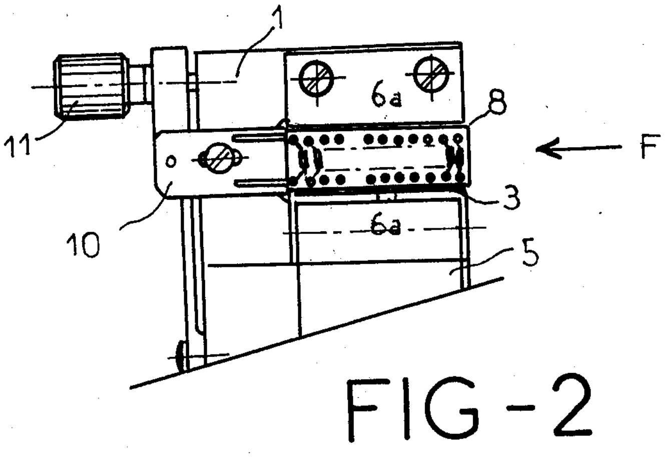
FIG. 2 is a partial plan view of the pedestal and of the control means by which one obtains the correct positioning in relation to the welding peen.

FIG. 2 is a plan view of the pedestal 1. The opening or slot 6 of the pedestal defines a slideway for the printed circuit of the connection 8. The connector 7 is inserted by hand in the slideway in accordance with the direction indicated by the arrow F until it contacts a bolt 10. The slideway 6 has at its center two small embossings **6*a* for a uniform distributed support over the peen 9 on the printed circuit of the connection 8. When the printed circuit is clamped, the welding head is lowered and by means of a binocular microscope 20** the coincidence of the teeth of the peen and of the conductive zones of the printed circuit is verified.

Figure 3:
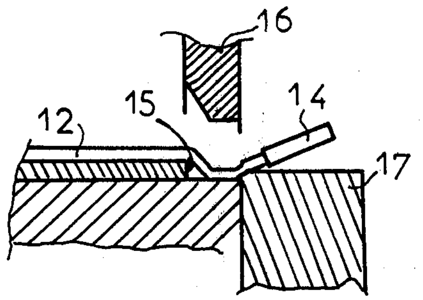
FIG. 3 is a schematic view of the bending apparatus.

If this coincidence is not adequate, the connection 8 is shifted laterally by rotating the knurled button 11 which controls a micrometer screw in solid connection with the bolt 10. As soon as the coincidence is attained, the connector is in the welding position. The conductive zones of the connection 8 have been previously welded onto the connector by wave soldering such that they are covered by a welding thickness sufficient for connection with the cable wires, without additional support. The multiwire cable is, at first, stripped close to its end by cutting off the sheathing and its transfer to the side of the free end, with the aid of a stripping device of a known type. By sliding the sheathing over the wires, they are bared over a portion of their length, a portion that is slightly larger than that of the plate bearing the printed circuit. In FIG. 3, the cable 12 may be seen, which enters a bending and precutting device whose principle is represented by this illustration.

Figure 4:
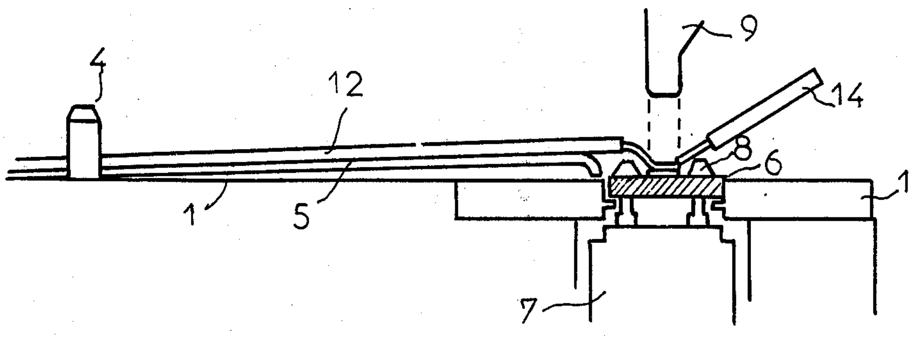
FIG. 4 is a schematic view of the pedestal and welding head on an enlarged scale with the cable in the welding position.

The length of the sheathing 14 which was cut off is kept on the end of the cable for protective purposes. In fact, it is essential that the wires remain parallel during the further operations of welding, and the keeping of the wires in the sheath 14 assures that parallelism. The length of the bared cable 15 is placed beneath a guillotine 16 which is lowered by means of a lever so as to curve the cable, as shown in FIG. 3, while the right part of the wires comes to rest on a knife 17 due to the effect of the pressure exerted by the guillotine 16. The cable is then placed on the welding machine, as shown in FIG. 4. It enters between the two feet 4 and over the holding spring 5 whose function it is to lift the cable over the printed circuit of the connection 8 so that the bent part of the bared cable does not get hooked up on the wedges of the printed circuit in the course of its positioning.

Figure 5:
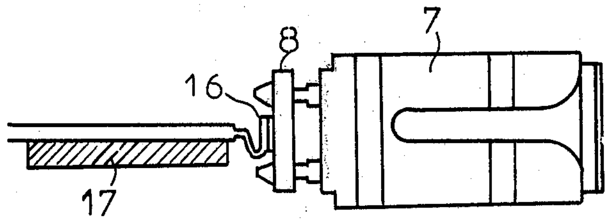
FIG. 5 is a side view of the welded connector.

During the first drop of the peen 9 which stops at about 1.5 mm from the upper surface of the printed circuit, the wires of the cable are locked in the corresponding depressions of the peen, due to the effect of the spring 5, which in this manner keeps the wires of the cable enclosed. The positioning of the wires is ascertained by the microscope. The second drop of the peen 9 brings it to its position of rest against the pedestal 1 with adequate pressure, followed by the release and by the welding operation. The portion 16 of each wire is then welded to the corresponding conductive zone of the printed circuit. The precut portion and the sheathing 14 are then removed by breaking-off, and, by way of a support piece 17, the cable is aligned with the connector, as illustrated in FIG. 5, such that the bent portion of the wires achieve a mechanically elastic contact with the connection 8 welded onto the connector 7.

Figure 6:
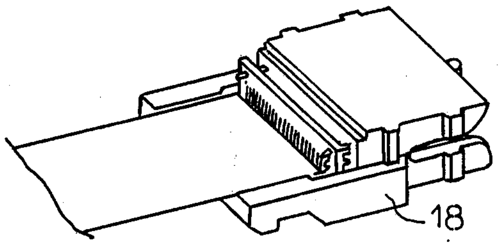
FIG. 6 is a perspective view of the finished connector.
Figure 7B:
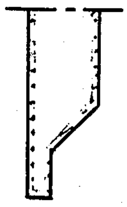
FIGS. 7*a* and 7*b* are front, and side elevational views, respectively, of the welding peen.
Figure 7A:
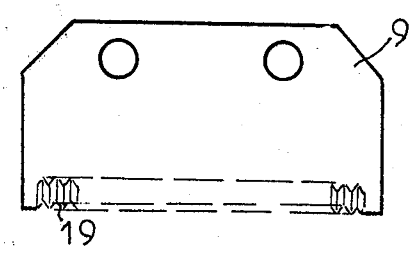

The connector-welding assembly is best enclosed in a hood, for example, of plastic material, of which one single half 18 is represented in FIG. 6. FIGS. 7*a* and 7*b* represent a peen 9 according to the invention whose lower part includes a notch 19 whose pitch corresponds with that of the cable wires. The peen 9 is hollow and attached to the welding head 2 by 4 screws, not shown 20.

What is claimed is:

1. A welding device for use in welding plural wires of a multiwire flat cable of the type wherein the wires are arranged in predetermined evenly spaced insulated relation within an insulating sheath, to a printed circuit having conductive zones of a predetermined spacing corresponding to the spacing of the wires, said device comprising a welding head and a pedestal below said welding head, aid pedestal having first means for supporting a printed circuit including a slideway for slideably receiving a printed circuit, and second means on said pedestal defining a guide path for a multiwire flat cable, said second means including a pair of guide feed spaced transversely of said guide path and a cable holding spring extending longitudinally of said guide path and in elevated relation to said pedestal for holding a cable in an elevated position relative to said pedestal.

2. A welding device in accordance with claim 1 wherein said slideway extends transversely of said guide path, and there are stop means at one end of said slideway for transversely positioning a printed circuit in alignment with wires positioned in said guide path.

3. A welding device in accordance with claim 2 wherein said stop means includes a bolt, and mounting means mounting said bolt for lateral displacement, said mounting means including a micrometer screw supporting said bolt for movement therewith.

4. A welding device according to claim 1 wherein said first means includes two embossings at the center of said slideway.

5. A welding device according to claim 1 wherein said welding head includes a peen having a lower end in the form of a plurality of teeth extending transversely of said guide path and having spaces therebetween for receiving wires, said spaces having a spacing corresponding to the spacing of wires of an intended cable and said teeth being of a width in accordance with the space between adjacent wires.

6. A welding device in accordance with claim 5 wherein said slideway extends transversely of said guide path, and there are stop means at one end of said slideway for transversely positioning a printed circuit in alignment with wires positioned in said guide path.

7. A welding device in accordance with claim 6 wherein said stop means includes a bolt, and mounting means mounting said bolt for lateral displacement, said mounting means including a micrometer screw supporting said bolt for movement therewith.

8. A welding device according to claim 7 together with a binocular microscope for viewing said teeth of said welding peen and a printed circuit carried by said first means and for facilitating alignment of a printed circuit with said peen by means of said micrometer screw.

* * * * *